May 26, 1959 R. F. GAEBLER 2,888,311
TIME STUDY MACHINE
Filed June 25, 1954 9 Sheets—Sheet 1

INVENTOR.
ROBERT F. GAEBLER
BY John S. Cassidy
ATTORNEY

May 26, 1959 R. F. GAEBLER 2,888,311
TIME STUDY MACHINE

Filed June 25, 1954 9 Sheets-Sheet 2

INVENTOR.
ROBERT F. GAEBLER
BY John Cassidy
ATTORNEY

May 26, 1959     R. F. GAEBLER     2,888,311
TIME STUDY MACHINE Filed June 25, 1954     9 Sheets-Sheet 3

INVENTOR.
ROBERT F. GAEBLER
BY
ATTORNEY

May 26, 1959 R. F. GAEBLER 2,888,311
TIME STUDY MACHINE
Filed June 25, 1954 9 Sheets-Sheet 4

INVENTOR.
ROBERT F. GAEBLER
BY *John H. Cassidy*
ATTORNEY

May 26, 1959  R. F. GAEBLER  2,888,311
TIME STUDY MACHINE
Filed June 25, 1954  9 Sheets-Sheet 5

INVENTOR.
ROBERT F. GAEBLER
BY
ATTORNEY

May 26, 1959  R. F. GAEBLER  2,888,311
TIME STUDY MACHINE
Filed June 25, 1954  9 Sheets-Sheet 7

INVENTOR.
ROBERT F. GAEBLER
BY
ATTORNEY

May 26, 1959   R. F. GAEBLER   2,888,311
TIME STUDY MACHINE

Filed June 25, 1954   9 Sheets—Sheet 9

INVENTOR.
ROBERT F. GAEBLER
BY
ATTORNEY

United States Patent Office 2,888,311
Patented May 26, 1959

2,888,311

TIME STUDY MACHINE

Robert F. Gaebler, St. Louis, Mo.

Application June 25, 1954, Serial No. 439,422

11 Claims. (Cl. 346—127)

This invention pertains to a mechanism for use in making a time study of factory operations such as forming a part in which the time interval involved in each detail operation is to be measured.

An object of the invention is to provide a machine whereby a record chart may be moved at a uniform rate of speed while a marker is moved into engagement with the chart at the beginning of the time interval to be measured, making its mark on the moving chart during that interval, and disengaged from the chart at the end of the interval. Thus the length of the mark on the chart becomes a measure of the time interval.

Another object is to provide such an apparatus whereby successive intervals of time may be marked on the chart without any appreciable loss between the end of one interval and the beginning of the succeeding one.

Generally stated, the machine comprises a movable chart holder in the form of a rotating drum which is driven in rotation at a uniform rate of speed. Mounted in a position to be engageable with a chart on the drum is a pair of markers, together with means for moving said markers into engagement with the chart alternately, the second one being engaged simultaneously with the disengagement of the first. Thus, by bringing the first marker down upon the chart at the beginning of the first operation to be measured, the same begins to mark a line on the moving chart. At the end of the first operation, the markers are manipulated to lift one and depress the other so as to terminate the mark made by the first and start a new mark by the second. As the two markers are offset from one another, the marks on the chart will be distinct. By thus changing the markers at the end of each operation, a succession of lines is drawn on the chart. Means are provided for moving the markers axially along the drum in steps so as to displace the lines representing the time records of different operations. Provision is also made for measuring delays due to accidents and the like, such as the breaking of a drill or other tool. For this purpose, a stop watch is mounted on the machine and a manipulating element provided whereby the drum may be stopped and the watch started simultaneously upon the occurrence of any such accident, the time loss due to the accident is then measured by the stop watch and entered on an auxiliary record. At the end of such delay, by reverse movement of the manipulating lever, the drum may be started from the same position in which it was stopped. In this manner, a record of the successive time intervals is obtained on the chart in the form of lines, the length of each line representing the time of the operation.

A preferred embodiment of this invention is illustrated in the accompanying drawings, in which—

Figure 4:
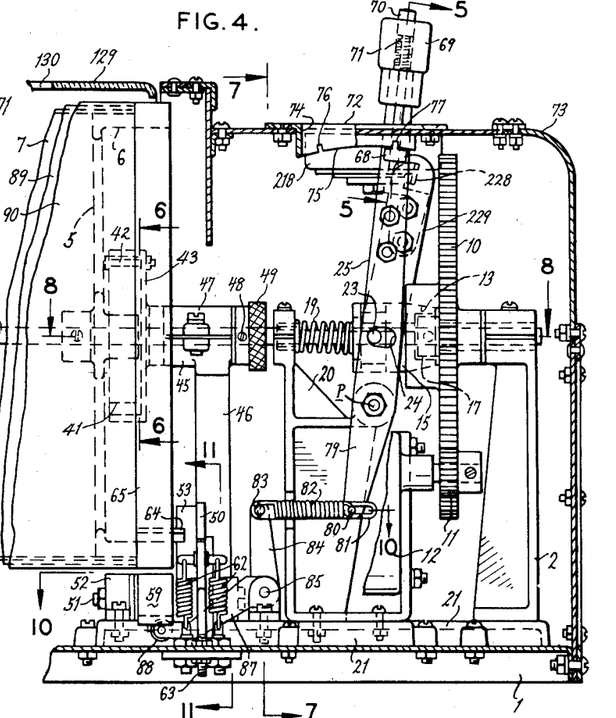
Fig. 4 is a section somewhat enlarged taken on line 4—4 of Fig. 1.
Figures 16, 17, 18:
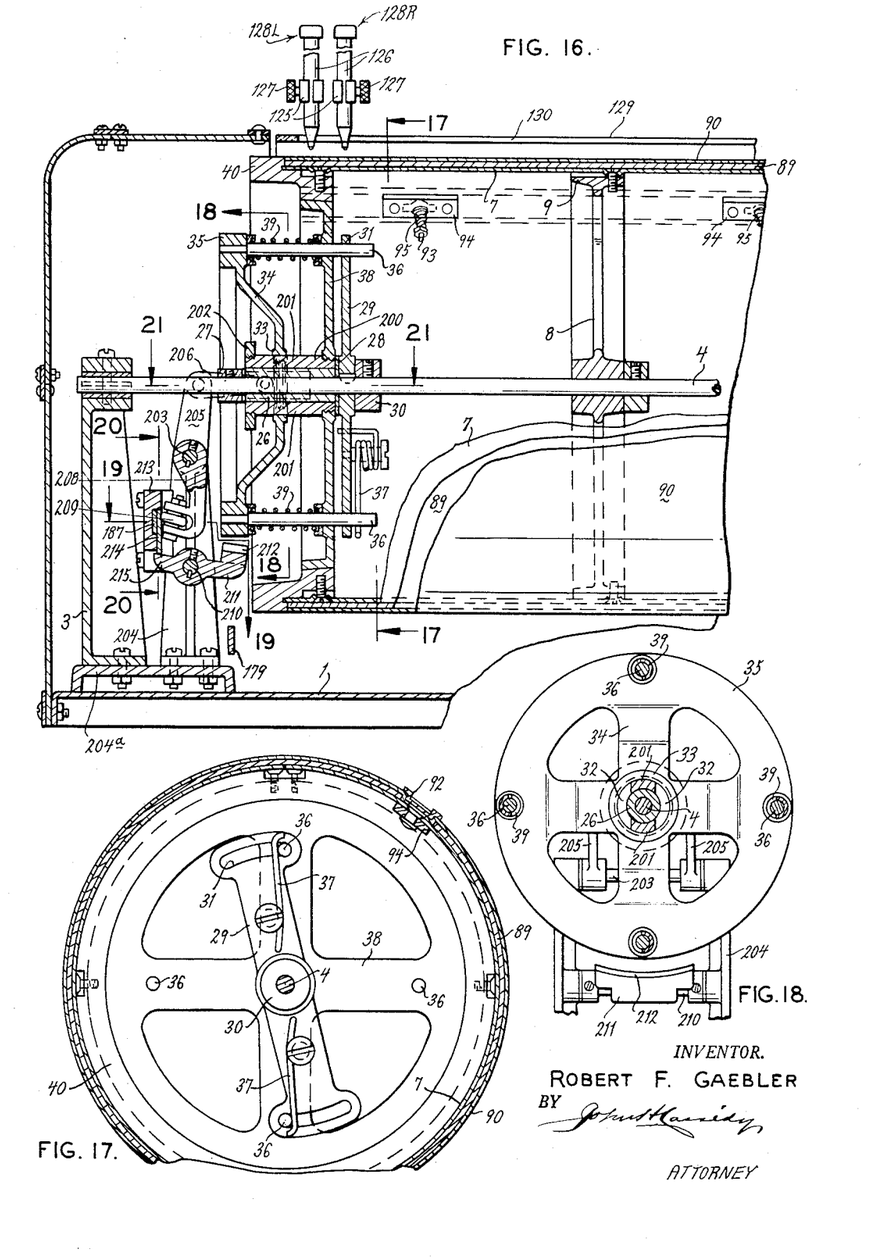
Fig. 16 is a section on line 16—16 of Fig. 13.
Fig. 17 is a section on line 17—17 of Fig. 16.
Fig. 18 is a section on line 18—18 of Fig. 16.

Referring to the drawing, 1 designates a base on which the machine is mounted. Suitably secured to the base 1 at its right hand end, as seen from the front of the machine (Fig. 4), is a supporting pedestal 2, and at its left hand end a similar pedestal 3 (Fig. 16). Journaled in suitable bearings in the pedestals 2 and 3 is a driving shaft 4 (Figs. 4, 8 and 16). Loosely mounted on the shaft 4 is a spider 5 having a rim 6 on which is mounted the right hand end of a drum 7 (Figs. 4 and 16). Similarly mounted on the shaft 4 near its middle is a second spider 8 (Fig. 16) having a rim 9 also secured to the drum 7. These spiders support the drum for rotation but are not driving elements, as they are free for rotation on the shaft 4.

Figures 7, 8, 22, 23:
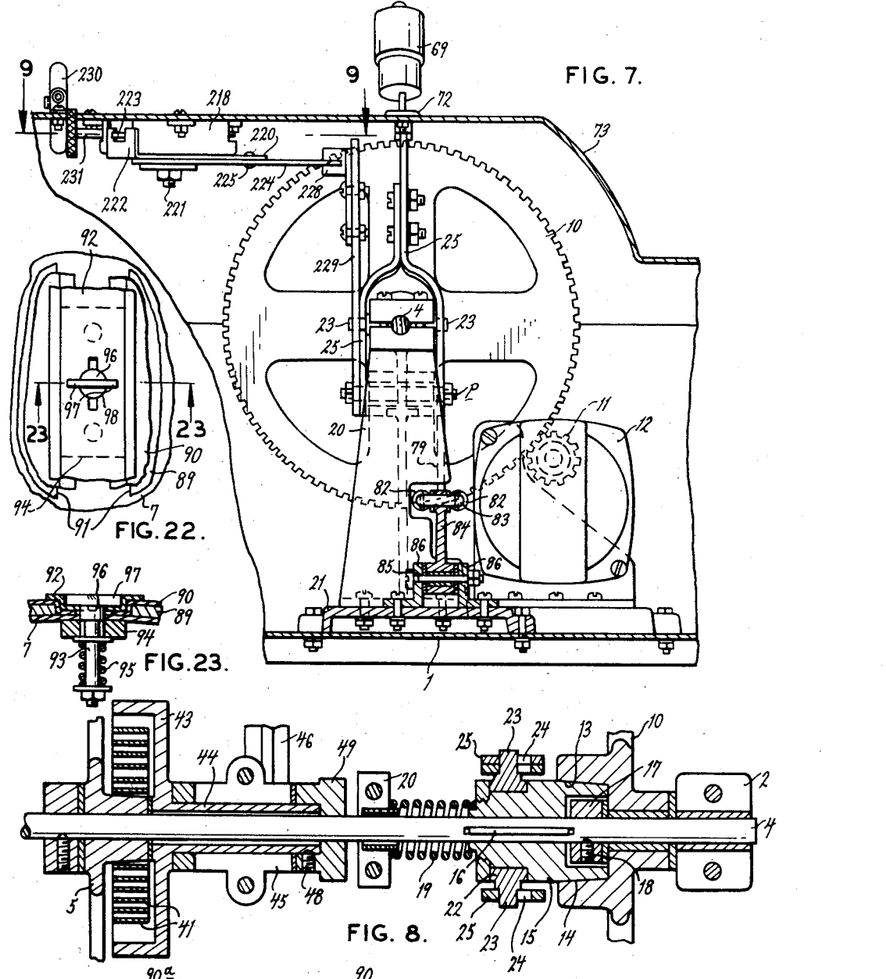
Fig. 7 is a section on line 7—7 of Fig. 4.
Fig. 8 is an enlarged section on line 8—8 of Fig. 4.
Fig. 22 is a fragmentary detail of the locking bar structure for securing the chart to the drum.
Fig. 23 is a section on line 23—23 of Fig. 22.

Mounted for free rotation on the shaft 4 adjacent to pedestal 2 is a gear 10 (Figs. 4 and 7). This gear meshes with a pinion 11 on a back-geared driving motor 12. The gear 10, driven by the motor 12 at a uniform speed, provides the drive for rotation of the drum 7. As shown in Fig. 8, the hub of the gear 10 is formed with a conical internal clutch face 13 adapted for engagement with a complementary clutch face 14 of a clutch element 15, slidably keyed to the shaft 4 by a key 16. Since the gear 10 is loose on the shaft, it is secured against endwise movement by being confined between the pedestal 2 and a collar 17 secured to the shaft 4 by a set screw 18. The collar 17 is housed within a bore formed in the clutch element 15 as shown in Fig. 8. Said clutch element 15 is acted upon by a compression spring 19 whose other end bears against a bracket 20 which is bolted to a sub-base 21 on the base 1 to which sub-base the pedestal 2 is also secured. The clutch member 15 has loosely mounted thereon a collar 22 having diametrically opposite pins 23 engaging slots 24 in a forked control lever 25. As will be more fully described hereinafter, the lever 25 may be moved so as to shift the collar 22 and thereby the clutch member 15 to the left, Fig. 8, so as to disengage the clutch from the driving gear 10. This interrupts the drive of the shaft 4 by the motor 12.

Figure 37:
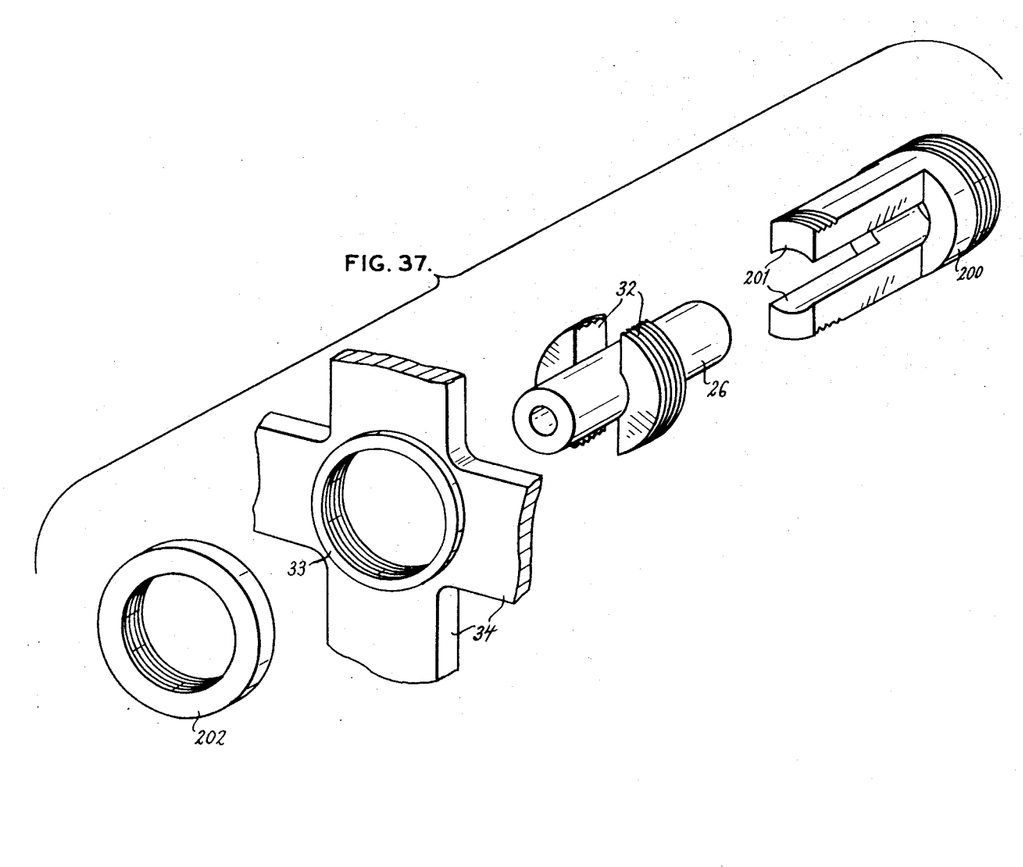
Fig. 37 is an exploded view of part of the mechanism for driving the drum.

The mechanism by which the drum 7 is connected to be driven by the shaft 4 is shown more particularly in Figs. 16, 17 and 37. As shown here, a sleeve 26, loose on the shaft 4, is secured against endwise movement toward the left by a collar 27 fixed to the shaft. At the other end of said sleeve and separated therefrom by a spacing washer 28, is a driving element 29 keyed to the shaft 4 and secured against endwise movement by a collar 30 fixed to the shaft 4. The element 29 is in the form of a double arm provided at its ends with arcuate slots 31. Screwed on a segmental collar 32 on the sleeve 26, is the hub 33 of a spider member 34 having a rim 35. Secured in the rim 35 are four pins 36, two of which pass through the slots 31 in the element 29. Mounted on the driving element 29 are two springs 37, the ends of which engage the pins 36 so as to urge them in a clockwise direction as seen from the right hand end of the machine, as shown in Fig. 17. These four pins also pass through a clutch member 38 which is urged to the right, Fig. 16, by springs 39 mounted on the pins 36. The clutch member 38 is adapted for engagement with a complementary clutch member 40 formed on the left hand rim of the drum 7. Thus when the clutch 38, 40 is engaged, the drum will be driven by the shaft 4 through the agency of the element 29, the springs 37, the pins 36 and the clutch member 38. It will be seen also that in order for this drive to be active, the clutch 13, 14 (Fig. 8) must be engaged so that the shaft 4 will be driven by the gear 10.

Figure 6:
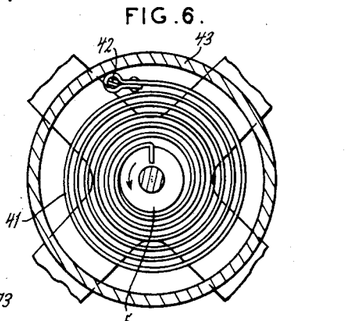
Fig. 6 is an enlarged section on line 6—6 of Fig. 4.

As shown in Figs. 6 and 8, the hub of the spider 5 has connected thereto a spiral spring 41, the outer end of which is connected by a pin 42 to a housing 43 surrounding the spring. The housing 43 is formed with a central axial bushing or sleeve 44 which is fitted over the shaft 4 with ample clearance so as not to contact the shaft. This bushing portion 44 is supported in a cradle 45 on a bracket 46 fixed in any suitable manner to the base 1. The cradle 45 has a cap 47 which may be clamped down upon the bushing 44 to lock the same in place. The bushing 44 has fixed thereto by means of a set screw 48 a knurled collar 49. By means of this collar, the bushing 44 and the housing 43 may be rotated to adjust the tension of the spring 41. This spring is arranged to tend to rotate the spider 5 in a counterclockwise direction as seen from the right of Fig. 8, and its purpose is to return the drum 7 to its starting position when released from its driving means. By loosening the cap 47, the collar 49 may be manipulated to turn the housing 43 so as to tension the spring 41 just sufficiently to cause it to turn the drum back to its starting position. The cap is then clamped tight so as to secure this adjustment.

In order to stop the drum at its zero position, a braking device is provided as shown in Figs. 4, 10, 11 and 12. A bell crank, one arm of which is formed by a flat plate 50 pivoted on a pin 51, supported in brackets 52, secured to the base 21, has a second arm formed by an angle plate 53 secured to the plate 50 by screws 54. A link 55 is adjustably secured to the arm 50 by screws 56 passing through a slot 57 in said link. Secured to the lower end of the link 55 is a laterally extending finger 58. Also pivoted on the pin 51 is a brake shoe 59 which is provided with a suitable brake lining 60. Secured to the shoe 59 is an angle bracket 61 extending laterally so as to be positioned above the finger 58 to be engaged by said finger when the latter moves upward. The outer end of the arm 50 is connected to a pair of springs 62, the other ends of which are connected to the base 1. These springs hold the arm 50 down upon an adjustable stop pin 63 adjustable for height in the base 1.

This braking device is bolted to the sub-base 21 in such a position that a lug 64 extending outward from a braking rim 65, forming a part of the rim 6 of the drum, will strike the angle plate 53 when the drum has completed its return movement. This impact of the lug 64 with the plate 53 will cause the arm 50 to pivot on the pin 51, thereby lifting the link 55 and its finger 58 into contact with the angle bracket 61 whereupon the brake shoe 59 is raised, pivoting on the pin 51 until it contacts the brake rim 65 to stop further movement of the drum. By adjusting the tension of the springs 62 and the initial position of the arm 50 by means of the stop 63, an adjustment may be obtained whereby the spring tension provides just enough force resisting the movement of the lug 64 to dissipate the inertia of the rotating drum and bring it to rest gently at its zero position.

Figure 5:
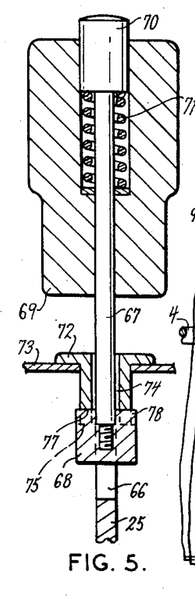
Fig. 5 is a section further enlarged taken on line 5—5 of Fig. 4.
Figures 10, 11, 12, 15, 19, 20, 21:
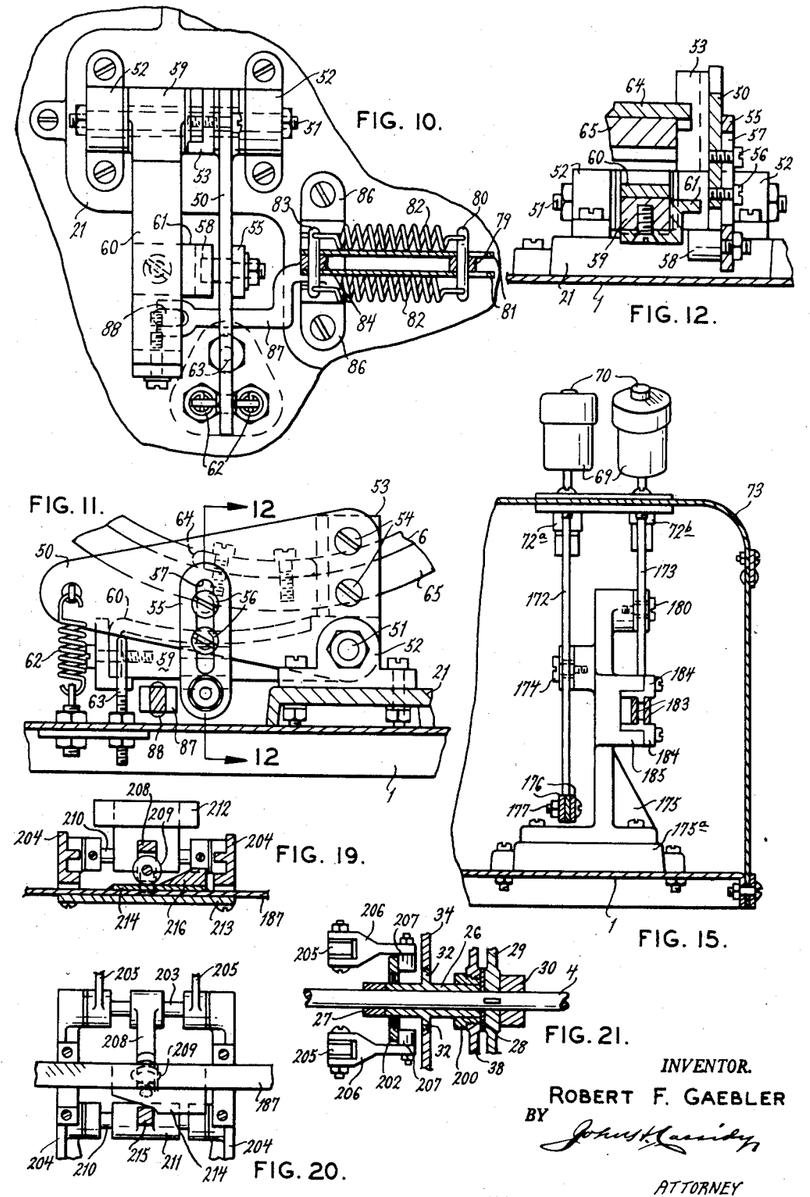
Fig. 10 is an enlarged section of line 10—10 of Fig. 4.
Fig. 11 is an enlarged section on line 11—11 of Fig. 4.
Fig. 12 is a section on line 12—12 of Fig. 11.
Fig. 15 is a section on line 15—15 of Fig. 13.
Fig. 19 is a section on line 19—19 of Fig. 16.
Fig. 20 is a section on line 20—20 of Fig. 16.
Fig. 21 is a section on line 21—21 of Fig. 16.

The drum may also be braked to rest by manipulation of the control lever 25. This lever has its upper end formed with a slot 66 in which a pin 67 is movable longitudinally (see Fig. 5). The pin 67 is maintained within the slot by a lower collar 68 and an upper manipulating handle 69 which is fixed to the upper part of the lever. The upper end of the pin 67 has a release button 70 movable in a bore in the handle 69 and supported by a spring 71. By pressing on the button 70, the pin 67 may be moved downward in the slot 66 carrying with it the collar 68. The lever 25 and the pin 67 pass through a locking frame 72 mounted in the cover or housing 73 which houses the entire machine. Said locking frame has a slot 74 through which the lever passes. The lower edge of the frame 72 has an arcuate form as shown at 75, Fig. 4, and is provided with spaced notches 76 and 77 adapted to receive a projection 78 on the collar 68 so as to lock the lever in either its "in" position at 77 or its "out" position at 76. When said lever is in its "in" position, the clutch 13, 14 is engaged to drive the shaft 4. In order to move the lever to its "out" position, the button 70 is depressed to move the projection 78 out of the notch 77 after which the lever may be moved to the left, Fig. 4. This lever is pivoted at P on the bracket 20 and has a downward extension 79. This lower extension is connected at its end by a pin 80 to a pair of links 81 and a pair of springs 82. The other ends of the links 81 and the springs 82 are connected by a pin 83 to one arm 84 of a bellcrank lever pivoted at 85 on brackets 86 on the base 1. Said bellcrank has an offset arm 87 extending under the brake shoe 59 as shown in Figs. 4, 10, and 11, and provided with a roller 88 engageable with said brake shoe 59 when the arm 87 is raised. When the lever 25 is moved to its "out" position, so as to engage the projection 78 of the collar 68, in the notch 76, the lower extension 79 of said lever swings to the right, Fig. 4, thereby swinging the bellcrank 84, 87 so as to raise the roller 88 into contact with the brake shoe 59 which raises said brake shoe into contact with the brake rim 65 of the drum. These connections are adjustable so that the brake shoe contacts the rim 65 simultaneously upon release of the clutch 13, 14 so that movement of the drum may be stopped without permitting any retrograde movement thereof.

The drum 7 may be formed of sheet metal such as aluminum or the like, and is secured to the rings 6, 8, and 40 in any suitable manner, as by screws, as shown. This metal drum surface is covered with a pad 89 of composition, rubber, or other suitable material, so as to form a suitable support for a chart 90 which is mounted thereon. As shown in Figs. 17, 22 and 23, the pad 89 covers slightly less than the complete circumference of the drum 7 providing at its ends a space 91 adapted to receive a locking bar 92 for holding the chart in place. At intervals along the drum, the same is provided with locking pins 93 mounted in blocks 94 on the inside of the drum and tensioned by springs 95. Each of these pins has a head 96 provided with oppositely extending wings 97. The locking bar 92 is provided with matching holes 98 formed to receive the head 96 and the wings 97 when in one position so that after passing the same through said hole, the wings may be rotated to a crosswise position as shown in Fig. 23, so as to secure the locking bar in place. When a chart is to be applied, the locking bar is removed, the chart wrapped around the drum with its ends extending into the space 91, and the locking bar is set down upon those ends with the heads of the pins 93 passing through the holes 98 after which said pins are turned to set the wings crosswise and the chart is then held in place by the locking bar 92 under pressure of the springs 95.

Figures 25, 26:
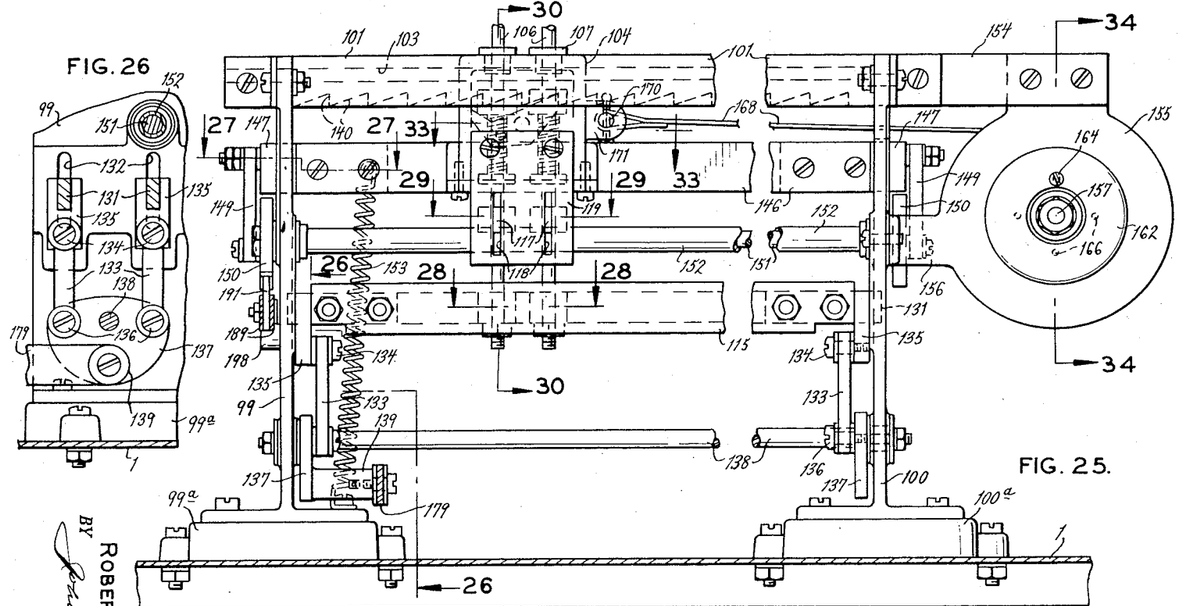
Fig. 25 is a front view showing the control mechanism for raising and lowering the marker pins and for shifting them along the drum.
Fig. 26 is a section on line 26—26 of Fig. 25.
Figure 27:
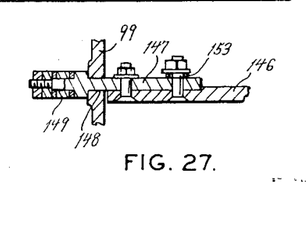
Fig. 27 is a section on line 27—27 of Fig. 25.

The mounting of the markers for marking the chart is illustrated more particularly in Figs. 13 and 25 to 35, inclusive. A pair of end supports 99 and 100, Fig. 25, are mounted on sub-bases 99a and 100a which in turn are bolted to the base 1 to the rear of the drum and adjacent opposite ends thereof. Mounted on and extending between these supports at their upper ends is a pair of ways formed by bars 101 and 102, Fig. 30. These bars are spaced apart and the inner face of each is provided with a groove 103 extending along substantially its entire length. Mounted to travel along these grooves is a hollow carriage 104 having side projections 105 slidably fitting in said grooves. Duplicate markers are mounted in the carriage 104. As these are duplicates, only one will be described. Such marker comprises a stem 106 slidably mounted in a bushing 107 at the top of the carriage and a similar bushing 108 in the bottom plate 109 of the carriage. A spring 110 surrounding the stem 106 bears against the bushing 108 and a collar 111 secured to the stem. The lower end of the stem is screwed into a collar 112 having a laterally extending wing 113. Said collar is locked in position by a nut 114. The wing 113 on each stem extends into one of a pair of channels 115 mounted for up-and-down movement in the end supports 99 and 100. The stem 106 has also mounted thereon a collar 116 having a wing 117 extending into a slot 118 in an apron 119 secured to the carriage 104 and extending downward therefrom. The slots 118 extend vertically and as the collar 116 may be fixed in position on the stem 106 by a set screw 120, these slots secure the stems 106 against rotation.

Figure 1:
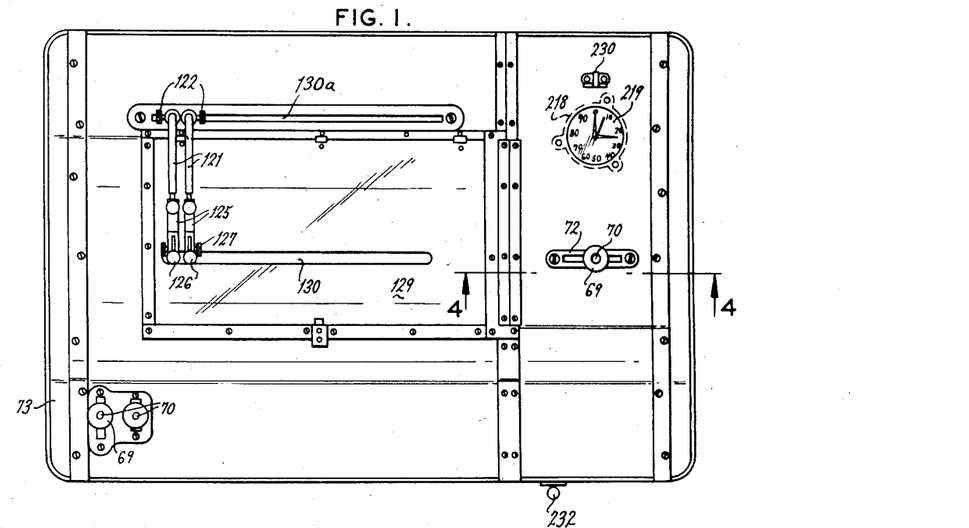
Fig. 1 is a plan view of a machine embodying this invention.

Mounted on top of the stem 106 is a tubular curved arm 121. This arm may be secured in adjusted position on the stem by a thumb screw 122. The upper end of the arm is equipped with a shank 123 on which is adjustably mounted by a thumbscrew 124 a clamp 125 in which a pen holder 126 may be clamped by a thumbscrew 127. The pen holder 126 may be of any suitable type adapted to hold a pen or marker 128 and usually provided with a spring support adapted to bring said marker into yielding contact with the chart 90 on the drum. The upper part of the housing 73 (Fig. 1) is provided with a hinged window 129 of transparent plastic or the like, having a slot 130 through which the pens 128 may extend to contact the chart and along which said pens may travel. At the same time, the stems 106 travel along a parallel slot 130a in the housing 73.

Figure 28:
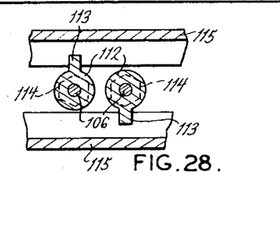
Fig. 28 is a section on line 28—28 of Fig. 25.
Figure 29:
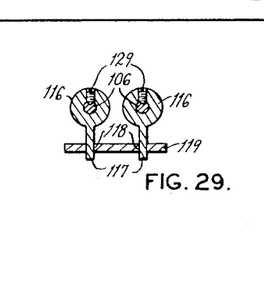
Fig. 29 is a section on line 29—29 of Fig. 25.

Each channel 115 (Fig. 25) has attached at each end a metal guide 131 extending into a slot or groove 132 in each of the supports 99 and 100, said guides serving to maintain said channels in position during their up-and-down travel. Each channel guide has a downward extension 135, to which is connected one end of a link 133, pivoting at 134 on a shoulder screw. The other link end is connected by a shoulder screw at 136 to a rocker plate 137. Said rocker plates are connected by a shaft 138 extending between them and journaled at its ends in the supports 99 and 100. Both said rocker plates are fixed to said shaft so that they move in unison. One of said rocker plates, namely, the one at the left in Fig. 25, is provided with a lateral extension 139 at a position offset from the shaft 138. It will be seen that by rocking the plates 137 by a mechanism which will be described presently, the shaft 138 causes both plates to rock in unison, whereby through the agency of the links 133, one of the channels 115 will be raised, while the other will be lowered. Since the two marker stems 106 are engaged one with one of the channels 115 and the other with the other, by positioning the wings 113 oppositely, as shown in Fig. 28, the movement of the channels 115 will cause corresponding movement of the marker stems and therefore of the pens 128.

Figures 30, 31, 32, 33, 34, 35:
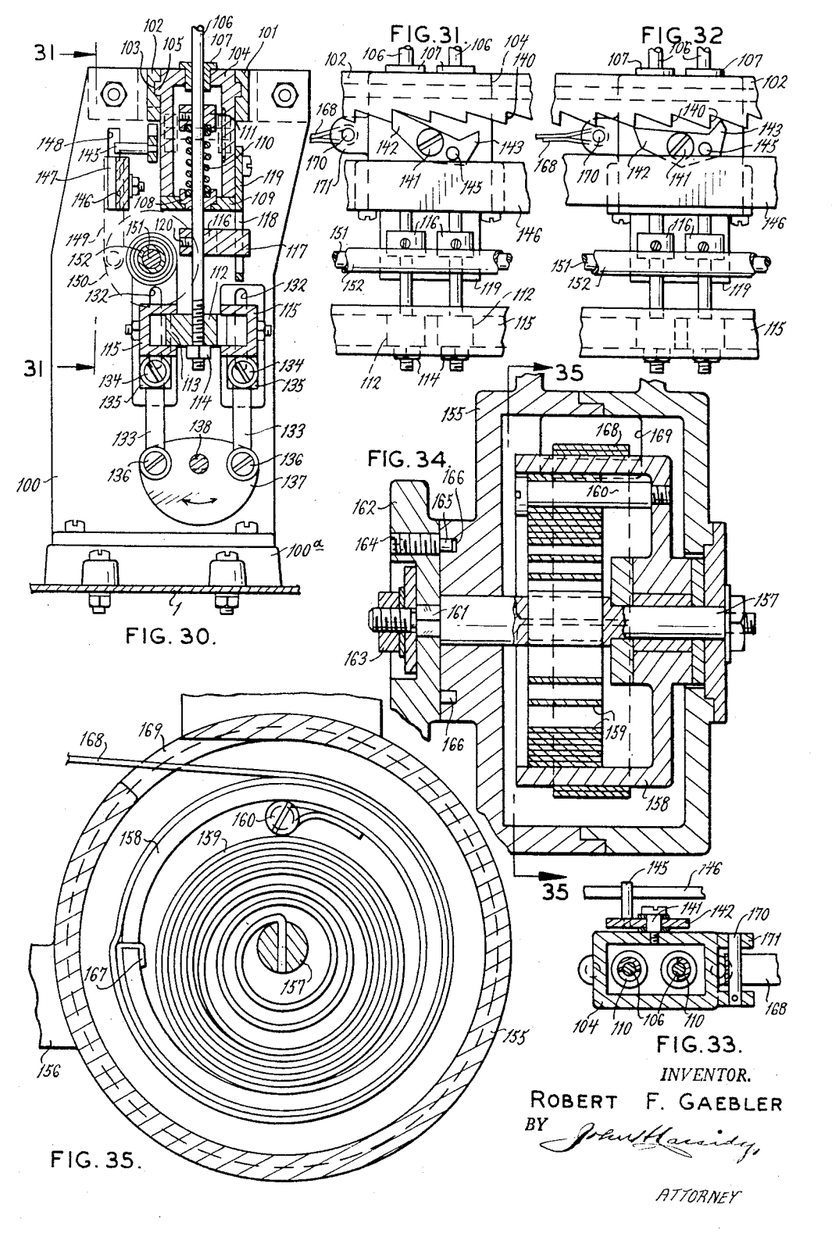
Fig. 30 is a section on line 30—30 of Fig. 25.
Fig. 31 is a section on line 31—31 of Fig. 30.
Fig. 32 is a view similar to Fig. 31, showing the position of parts during the shifting movement of the carriage.
Fig. 33 is a section on line 33—33 of Fig. 25.
Fig. 34 is an enlarged section on line 34—34 of Fig. 25.
Fig. 35 is a section on line 35—35 of Fig. 34.

The top bar 102, Fig. 30, in which the carriage 104 travels, is provided at its lower edge with a series of sawtooth notches 140 forming a ratch, Figs. 25, 31 and 32. Pivoted at 141 on the rear of the carriage 104 is a pawl having a long tooth 142 and a short tooth 143. The pawl has a pin 145 extending rearward therefrom. A bar 146 extends between the supports 99 and 100 just below the pin 145 and is provided with extensions 147 movable in slots 148 in the supports 99 and 100. Each end of the bar 146 is connected by a link 149 with a rocker disk 150, the two disks 150 at the ends of the bar being connected by a shaft 151 journaled in the end supports 99 and 100, and enclosed in a tube 152. Said disks are both secured to the shaft so that they operate in unison to elevate the bar 146. After such elevation, a spring 153 connected to said bar 146 and to the base 1 or other fixed part operates to return the bar to its lower position.

As shown in Figs. 25, 34, and 35, supported on overhang 154 of bars 101—102, is a housing 155 having a lateral brace 156 also secured to the support 100 so as to support said housing rigidly. Journaled in said housing is a shaft 157 on which a hollow drum 158, enclosed within the housing 155, revolves. A spiral spring 159 is secured at its center to the shaft 157 as shown in Fig. 35, and its outer end is attached to a pin 160 secured to the drum 158. The shaft 157 has a squared portion 161 fitted into a square central hole of a manipulating disk 162. The disk 162 is secured to the shaft by a nut 163 and to the housing 155 by a locking screw 164 having a reduced portion 165 adapted to be fitted into any one of a series of depressions 166 in the front face of the housing 155. By withdrawing the screw 164 from the depression 166, the disk 162 may be rotated so as to rotate the shaft 157 to tension the spring 159. Secured to the drum 158 at 167, Fig. 35, is a steel band 168 which is wrapped several times around the drum 158 and then passes out of the housing 155 through an opening 169. The other end of this band is connected to a pin 170 mounted in ears 171 on the carriage 104 (see Figs. 25, 31 and 32). In use, the tension of the spring 159 is adjusted as described, so as to be sufficient to move the carriage 104 clear to the right end of the ways, Fig. 25. The carriage is then moved by hand to the left end where it is held by engagement of the pawl 142 with one of the teeth 140.

When the tripping bar 146, Fig. 25, is raised by rocking the disks 150, as will be described hereinafter, said bar engages the pin 145 (see Figs. 31 and 32), elevating that pin and thereby rocking the pawl to the position shown in Fig. 32 wherein the tooth 142 is withdrawn from the notch 140. As soon as the pawl has escaped from the notch, the tension of the band 168 moves the carriage to the left, Fig. 32. (Since Figs. 31 and 32 represent rear views, this is movement to the right, Fig. 25.) As shown in Fig. 32, the tooth 143 is now in a position to contact one of the teeth of the ratchet 140 as the carriage moves to the left. Such movement of the carriage will therefore cause the tooth 143 to be depressed while the tooth 142 is elevated so that it must enter the succeeding notch in the ratchet. Thus, the movement of the carriage is limited to the distance between the two successive notches, or one step of the ratchet. This distance is greater than the space between the pens 128 so that the first pen will be shifted beyond the preceding position of the second pen. Since the bar 146 is released as soon as the pawl has been actuated, it is returned by the spring 153.

Figure 2:
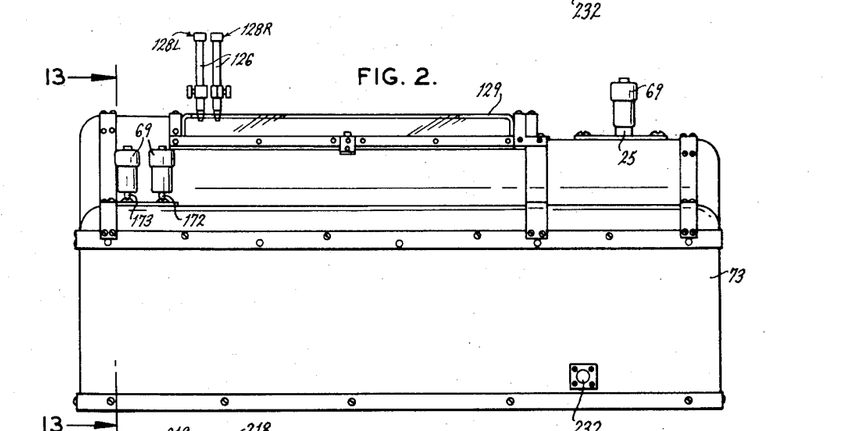
Fig. 2 is a front view of the same.
Figure 3:
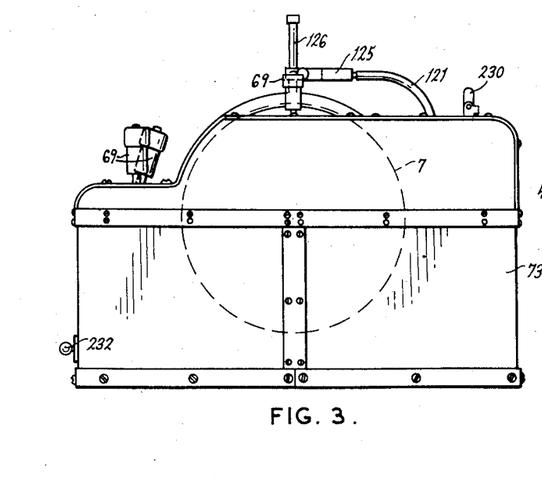
Fig. 3 is a right hand end view of Fig. 2.
Figures 13, 14, 24:
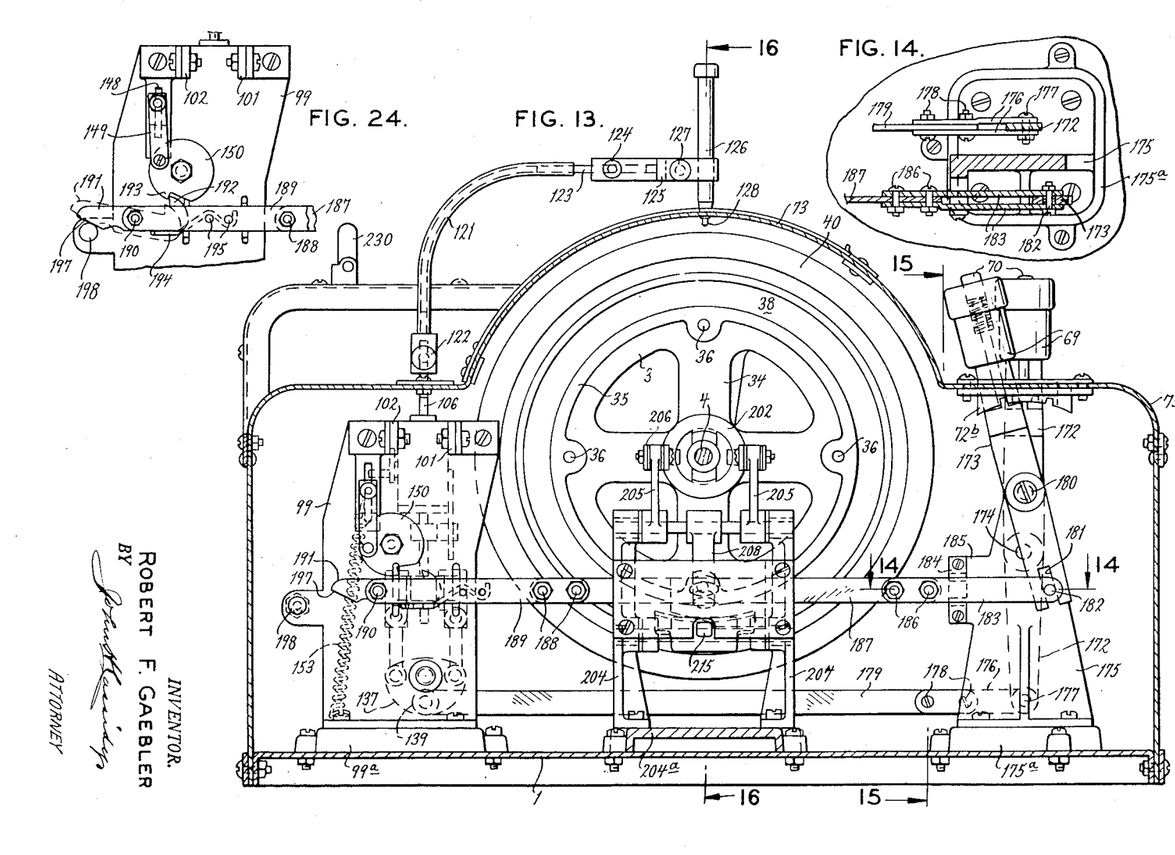
Fig. 13 is an enlarged section on line 13—13 of Fig. 2.
Fig. 14 is a section on line 14—14 of Fig. 13.
Fig. 24 is a detail of Fig. 13 with parts shown in another position.

Referring now to Figs. 13 to 16, a manipulating lever 172 is provided for operating the marker stems 106, and a second lever 173 for controlling the movements of the carriage 104 and of the drum 7. These levers are provided with manipulating handles 69 and buttons 70, similar in all respects to those described in connection with the lever 25. Also, they pass through the housing 73 by way of locking frames 72a and 72b, respectively. The lever 172 is pivoted at 174 on a bracket 175 mounted on sub-base 175a, which in turn is bolted to casing base 1, and its lower end is pivoted to a pair of links 176 by a stud 177. Said links are rigidly connected by spaced screws 178 to a bar 179 extending rearward past the drum 7, as shown in Fig. 13 and connected at its other end to the extension 139 of the left hand rocking plate 137 (see Fig. 25). Accordingly, when the lever 172 is moved toward the front of the machine, that is, to the right, Fig. 13, the bar 179 is moved to the left, thereby rocking the plate 137 so as to elevate the left hand pen 128L, Figs. 2 and 16, and simultaneously to depress the right hand pen 128R to bring it into engagement with the chart 90 on the drum 7. Reverse movement of the lever 172 will of course have the reverse effect, that is, to lift the right hand pen and move the left hand pen into engagement with the chart.

The lever 173 is pivoted at 180 on the bracket 175 (see Figs. 13 and 15) and its lower end has a slot 181 receiving a pin 182 secured to a pair of links 183 sliding in guides 184 in a bracket 185 on the supporting bracket 175. The links 183 are rigidly connected by spaced screws 186 to a bar 187 extending rearward past the end of the drum 7, as shown in Fig. 13, and rigidly connected at its other end by spaced screws 188 to a pair of links 189. Pivoted at 190 between the links 189 is a pawl 191 having a tooth 192 engageable with a tooth 193 formed on the left hand rocker disk 150 (see Figs. 13 and 24). The pawl 191 is biased by a spring 194 located between the links 189 and interlocked with a pair of pins 195 extending therebetween.

It will be seen that by this arrangement, movement of the lever 173 toward the front of the machine or to the right, Fig. 13, acting through the agency of the bar 187, will move the pawl 191 to the left, Figs. 13 and 24, so as to engage the tooth 193 and rock the disks 150, which action elevates the tripping bar 146 to release the carriage 104 for a one-step movement along the drum. The left end of the pawl 191 is formed with a cam 197 adapted to engage a pin 198 on the support 99 when the pawl approaches the end of its movement. This cam acts to lift this end of the pawl, and thereby depress the tooth 192 so as to disengage it from the tooth 193, Fig. 24. This releases the disk 150 and permits the tripping bar 146 to be returned by the spring 153.

When the carriage 104 is shifted along the ways, it locates the pens 128 in a new position with reference to the drum 7, lining up the chart for the next succeeding series of recordings comprising an operation. This shift is always made at the end of each series, or a completed operation under study. As it requires a small time interval to carry out this shift and to permit the drum to return to its zero position, means are provided to compensate for the interval of time occupied by those changes so that the mark continued in the new position may still accurately indicate the time of the specific operation being studied. The mechanism for accomplishing this is illustrated mainly in Figs. 13, 16, 17 and 18.

As previously pointed out, the drum is driven through the agency of the clutch 38, 40, Fig. 16, which in turn is driven by the driving element 29 and the springs 37. The hub 33 of the spider member 34 is fixed to the sleeve 26 as already described. Accordingly, since said sleeve is secured against endwise movement along the shaft 4, said spider member is also thus secured. The clutch member 38, however, is mounted on a sleeve 200 which is formed with two prongs 201 extending along the shaft 4 and passing between the segments of the collar 32 and through the bore of the hub 33 as shown in Fig. 18. This sleeve 200 with its prongs is free to slide axially with reference to the hub 33, except as it is subject to the pressure of the springs 39 which act in such a direction as to urge the clutch member 38 into engagement with the clutch ring 40. Secured to the left hand end, Fig. 16, of the prongs 201 is a collar 202 providing means of engagement whereby the sleeve 200 and the member 38 may be moved relatively to the hub 33.

Keyed to a shaft 203 journaled in pedestals 204 secured to sub-base 204a, in turn secured to base 1, is a pair of levers 205 (Figs. 13 and 16). Rigidly secured to the ends of the levers 205 are auxiliary links 206, Fig. 21. Mounted on the ends of the links 206 are rollers 207 which extend behind the collar 202 so as to be engageable therewith to move the member 38. Also keyed to the shaft 203, Fig. 16, is a lever 208 extending downward and having journaled therein a roller 209. Also journaled in the pedestal 204 is a shaft 210 to which is keyed a brake lever 211 having a brake shoe 212, engageable with the rim 35 to brake the same and hold it stationary.

The bar 187 which actuates the mechanism for shifting the pen carriage passes through a guide 213 on the pedestal 204, Fig. 16. This bar has secured thereto by welding or otherwise a braking cam 214 engageable with an extension 215 of the braking lever 211, Figs. 19 and 20. As may be seen from Fig. 20, movement of the bar 187 to the left will cause this cam to depress the extension 215, thereby bringing the brake shoe 212 into contact with the rim 35. The bar 187 also has secured thereto a releasing cam 216, Fig. 19, which, when said bar is moved to the left, engages the roller 209 acting thereby to rock the shaft 203 so as to move the levers 205 to the left, Figs. 16 and 21. This brings the rollers 207 into engagement with the collar 202, moving that collar to the left to disengage the clutch member 38 from the rim 40. The adjustment is so made and the cams 214 and 216 so positioned on the bar 187 that the brake 212 engages the rim 35 to stop the latter a fraction of a second in advance of the disengagement of the clutch 38 from the rim 40. Accordingly, the clutch member 38 is held stationary while it is disengaged from the rim 40.

In the operation of this mechanism, when the drum approaches the end of one revolution, the operator shifts the lever 172 to its neutral position, as shown in Fig. 13. This results in lifting whichever pen 128 was in contact with the chart to its intermediate position, also shown in Fig. 13, in which both pens are clear of the chart. Immediately upon such action, the operator also shifts the lever 173 to the right, Fig. 13, to its extreme position. This shifts the bar 187 which acts to set the brake 212 and release the clutch 38, 40 and simultaneously to rock the disk 150 so as to release the carriage 104 for movement one step along the ratchet 140 as already described. While the lever 173 is in this position, the drum 7 is free to move under the action of the spring 41, Figs. 4 and 6, to its starting position. Upon its arrival at that position, the action of the lug 64, the lever 50, and the brake shoe 59 bring the drum to rest at its starting position, as already described. The arrest of the clutch member 38, however, does not affect the rotation of the shaft 4, which continues at its normal rate. Accordingly, the driving element 29 also continues to move with the shaft 4, although the pins 36 are held stationary with the rim 35. The element 29, therefore, moves on relatively to the pins 36 thereby causing flexure of the springs 37. The slots 31 are made long enough to accommodate the ordinary interval required for these changes, namely, the shift of the carriage one notch along the ratchet, and the return of the drum to its starting position. This requires only a few seconds whereupon the operator again shifts the lever 173 back to the position shown in Fig. 13. This action causes the clutch member 38 to engage the rim 40 so as to reestablish the drive of the drum and instantly thereafter, the brake 212 is released so as to permit the drum to move. Simultaneously with the shift of the lever 173 to its position of Fig. 13, the operator moves the lever 172 toward the back or its "L" position, Fig. 1. Accordingly, the pen 128L will contact the chart in its zero position. Thereafter, as soon as the brake 212 is released, the springs 37 acting on the pins 36 will move the clutch member 38 and the drum ahead at an accelerated rate so as to cause it to overtake the element 29 and move the pins 36 against the forward ends of the slots 31 as shown in Fig. 17. Since the flexure of these springs during the change-over interval must be proportional to the time elapsed during that interval, the forward shift of the drum caused by said springs will correspond to the length of that interval and a mark of corresponding length will be made by the pen 128 on the chart. In this way, the interval occupied in changing over is compensated for so that the mark on the chart gives an accurate measurement of the time.

Figure 9:
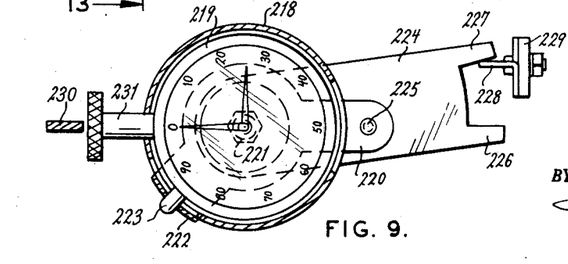
Fig. 9 is an enlarged section on line 9—9 of Fig. 7.

In making time studies of the character here involved, accidents sometimes occur, such as the breaking of a tool or the like, which involve time delays which are not a part of the normal operation under study. In order to take care of such occurrences, the housing 73 is formed with an opening adjacent the lever 25 in which opening a cup 218 is mounted to receive a stop watch 219, Figs. 4 and 9. An arm 220 pivoted at 221 concentric with the watch 219 has a bent-up portion 222 provided with a notch adapted to receive the operating lever 223 of the watch. Also pivoted at 221 is a lever 224 secured to the arm 220 as by a rivet 225. The arm 224 is formed with a pair of fingers 226 and 227 adapted for alternate engagement with a wing 228, on an extension 229 secured to one prong of the lever 25. The space between the fingers 226 and 227 accommodates movement of the extension 229 on the arm 25 when it engages and disengages the clutch 13, 14 so as to start and stop the operation of the shaft 4. This involves movement of the lever between its "in" and "out" positions, notch 77 to 76, Fig. 4. In case of the breakage of a tool or the like, the lever 25 is moved clear over to its position at the notch 76. During this movement, the wing 228 engages the finger 226 so as to rotate the lever 224 and with it the arm 220 to move the starting lever 223 of the watch, whereupon the watch starts to run. This movement of the lever 25 at the same time operates the lever 84, 87 to bring the brake 59 into engagement with the rim 65 so as to stop the drum. Accordingly, the drum is stopped in the position which it occupied at the instant that the accident occurred. The watch is permitted to run during the interval required to repair the tool or otherwise return conditions to normal operation. As soon as this has been done, the lever 25 is again moved to the notch 77, Fig. 4. This movement of the lever causes simultaneous engagement of the clutch 13, 14 and release of the brake 59, and also the stopping of the watch 219 by engagement of the wing 228 with the finger 227 to return the lever 224 and the arm 220 to the position of Fig. 9. The time interval shown by the watch is then recorded on a separate record. Meanwhile, the drum has been started and the time study operation continues from where it left off. A lever 230 is provided to operate the stem 231 of the watch so as to restore its hands to zero, ready for a new measurement.

In the use of this machine, the operator mounts a fresh chart 90, and with the lever 172 in neutral position as shown in Fig. 13; lever 173 in reverse or "out" position from that shown in Fig. 13; and the lever 25 in its "in" position. When ready to start the study, lever 172, Fig. 13, is pushed to the left. This brings down pen 128L. Lever 173, Fig. 13, is as shown. As soon as the operation starts, the investigator throws in motor switch 220, controlling the motor 12 and throws lever 25 into the position shown in Fig. 4. This engages the clutch 13, 14 to drive the shaft 4 and as the clutch 38, 40 is aleady engaged, the drum starts to turn at a uniform speed. At the end of each specific operation, the operator shifts the lever 172 to lift the first pen and bring down the second into contact with the chart. The first pen, 128L, has thus scribed a line sector whose length is proportional to the time of the first time element. The second pen starts its sector in line with the end of the first, but spaced to the right therefrom along the drum. Accordingly, the second operation is represented by a line which starts to the right and opposite the end of the first line sector. At the end of the second operation, the lever 172 is shifted back again so as to lift the second pen and bring down the first one. Again the third mark starts in line with the end of the second mark so that no appreciable time is lost between time elements. This procedure continues from one time element to another until all time elements comprising an operation are scribed. When the record marks of the time elements of any operation study have covered a complete revolution of the drum, the operator brings the lever 172 to neutral, simultaneously shifting lever 173 to the right, Fig. 13. These movements of the levers operate to lift both pens shifting the carriage one notch along the drum and return the drum to starting point for another operation study. As soon as the drum has arrived at its zero position, the operator again throws lever 173 to the left, Fig. 13, and moves the lever 172 from neutral to its left position. As already described, these movements of the levers cause the pen to be brought down upon the chart at the zero position, after which the drum is released and accelerated under the action of the springs 37 so as to overtake the driving element 29 and the shaft 4. From there on, the record continues and the sum of line sectors scribed represents an accurate measure of the time per operation.

It will be seen that this invention provides an efficient device whereby operations involving a succession of specific time elements are timed and recorded and the total operation time also established. The time of each time element is represented by the length of a line on the chart. Successive operations are accurately timed without any loss on the record in shifting from one operation to the next. Similarly, an operation of practically any duration within the limits of the chart can be timed, even though it continues beyond the time of one revolution of the drum.

Figure 36:
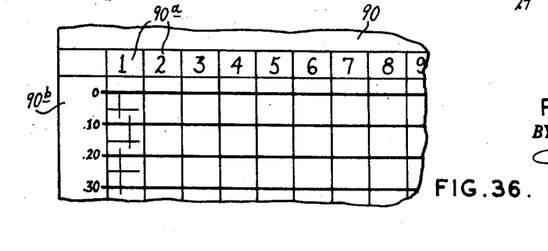
Fig. 36 shows a form of chart which may be used.

The chart 90 shown in Fig. 36 may have any suitable heading space for identifying the operation generally. The main part of the chart may be divided into a series of columns 90a, numbered serially to indicate the number of revolutions of the drum. In the left-hand column 90b, a scale of time may be provided. This may be divided into minutes or shorter intervals, the scale being such as to register accurately the time of rotation of the drum. The successive marks of the pens 128 will then appear on the chart as shown in the first column, the lines on the left-hand side of the column being made by the left-hand pen, and those on the right side by the right-hand pen.

Various changes may be made in the details of construction, within the scope of the appended claims, without departing from the spirit of this invention. Parts of the invention may be used without the whole and improvements may be added while retaining some or all of the advantages of the invention.

I claim:

1. In a time-study machine of the character described, a chart holder adapted to support a record chart, a marker, means supporting said marker for movement into and out of engagement with a chart on said holder, driving means moving said holder relatively to said marker at a uniform rate, said driving means including a continuously-driven element and a resilient connection from said element to said holder to drive the holder and normally locate the same with reference to said element, means operatively connected to said marker to shift said marker relatively to said holder in a direction transverse to the movement of said holder, and means operatively connected to said shifting means to be actuated upon operation of said shifting means to arrest said holder during such shifting movement of the marker and thereafter to release the same, said resilient connection operating by yielding to permit such arrest of the holder and by its elastic recovery to re-locate the same when released in its normal relation to said element.

2. In a device of the character described, a chart holder, a marker mounted for operation to mark a chart on said holder, driving means moving said holder relatively to said marker, said driving means including a timing element moving continuously at a uniform rate, an arrestable member resiliently connected with said element, a shiftable driving connection between said errestable member and said holder, means engaging said member operable to arrest said member, and means engaging the driving connection to shift the connection of said holder thereto, whereby upon release of said member from such arrest its resilient connection with said element will move said holder relatively to said element by an amount equal to the movement of said element during arrest of said member to compensate for the time of duration of such arrest.

3. In a device of the character described, a chart holder, a marker mounted for operation to mark a chart on said holder, time-controlled driving means including a retardable member having a shiftable driving connection with said holder, means engaging said member for shifting said driving connection, means engaging said member operable to retard said member while shifting said connection, and resilient means operatively connected between said retardable member and said driving means operating after such shift to accelerate said member through an extent of movement sufficient to compensate for the time of duration of such shift by the elastic recovery of the resilient means.

4. In a device of the character described, a rotary drum adapted to support a record chart, driving means including a driving element rotating continuously at a uniform rate, a member having a releasable driving connection with said drum and retardably connected with said driving element, a brake engageable to retard said member, means operable to simultaneously release said driving connection and set said brake, and means operating upon release of said brake to re-engage said driving connection and to accelerate said member to overtake said driving element.

5. In a device of the character described, a rotary drum adapted to support a record chart, driving means including a driving element rotating continuously at a uniform rate, a member having a releasable driving connection with said drum and retardably connected with said driving element, a brake engageable to retard said member, means operable to simultaneously release said driving connection and set said brake, and means operating upon release of said driving connection to return said drum to its starting position, and means operating upon release of said brake to re-engage said driving connection and to accelerate said member to overtake said driving element.

6. In a device of the character described, a rotary drum adapted to support a record chart, ways extending along said drum, a marker mounted for operation to mark a chart on said drum and for step-by-step movement along said ways, driving means including a driving element rotating continuously at a uniform rate, a member having a releasable driving connection with said drum and retardably connected with said driving element, means operating upon release of said driving connection to return said drum to its starting position, a brake engageable to retard said member, means operable to simultaneously release said driving connection, set said brake and move said marker one step along said ways, and means operating upon release of said brake to re-engage said driving connection and to accelerate said member to overtake said driving element.

7. In a device of the character described, a rotary drum adapted to support a record chart, ways extending along said drum, a marker carriage mounted for movement along said ways, driving means for moving said carriage, ratchet means limiting such movement to one step at a time, a tripping bar extending along said ways and movable relatively thereto, a marker mounted on said carriage for movement into and out of engagement with a chart on said drum, and manipulating means operable to simultaneously move said marker and move said bar to trip said ratchet means for one-step movement of said carriage.

8. In a device of the character described, a rotary drum adapted to support a record chart, a shaft connected to drive said drum, power means for driving said shaft, a clutch releasably connecting said shaft with said power means, a brake operable to stop said drum, a stop watch mounted adjacent said drum, and a manipulating element connected to said clutch operating upon forward movement to engage said clutch to connect said shaft and power means and by rearward return movement to an intermediate position to release said clutch, and the manipulating element being connected to said brake and said stop watch so that upon rearward movement the manipulating element simultaneously applies said brake and starts said watch and upon forward return movement to said intermediate position simultaneously releases said brake and stops said watch.

9. A device as defined in claim 8 in which the connection of said shaft to said drum includes a retardable member having a shiftable driving connection with said drum, means connected to said retardable member for shifting said driving connection, means engaging said member to retard said member while shifting said connection, and resilient means connected operatively between the retardable member and said shaft operating after such shift to accelerate said member through an extent of movement sufficient to compensate for the time of duration of such shift by the elastic recovery of the resilient means.

10. In a device of the character described, a rotary drum adapted to support a record chart, a shaft connected to drive said drum, power means for driving said shaft, a clutch releasably connecting said shaft with said drum, a brake operable to stop said drum, means connected to said clutch and brake for actuating same, means engaging said drum operating automatically upon release of said clutch to return said drum to its starting position, and braking means including a resilient element engageable and operated by said drum upon approaching said starting position to absorb its energy of rotation and bring it to a gentle stop said resilient element engaging said drum to stop said drum at said starting position.

11. In a device of the character described, a rotary drum adapted to support a record chart, ways extending along said drum, a marker carriage mounted for movement along said ways, driving means for moving said carriage, ratchet means for limiting such movement to one step at a time, driving means for said drum including a driving element rotating continuously at a uniform rate, a member having a releasable driving connection with said drum and retardably connected with said driving element, a brake engageable to retard said member, means operable to simultaneously release said driving connection, set said brake and operate said ratchet means to permit movement of said carriage, and means operating upon release of said brake to re-engage said driving connection and to accelerate said member to overtake said driving element.

References Cited in the file of this patent

UNITED STATES PATENTS

| | | |
|---|---|---|
| 461,478 | Heene | Oct. 20, 1891 |
| 1,284,521 | Williams | Nov. 12, 1918 |
| 1,558,828 | Brace | Oct. 27, 1925 |
| 1,754,503 | Dwelle | Apr. 15, 1930 |
| 1,755,449 | Marder | Apr. 22, 1930 |
| 1,813,777 | Stack | July 7, 1931 |
| 1,946,395 | Fagelson | Feb. 6, 1934 |
| 2,199,010 | Robb | Apr. 30, 1940 |
| 2,286,547 | Hutchins | June 16, 1942 |
| 2,445,272 | Keegan | July 13, 1948 |
| 2,479,986 | Thomas | Aug. 23, 1949 |
| 2,515,295 | Davis | July 18, 1950 |
| 2,598,541 | Hill | May 27, 1952 |
| 2,609,045 | Kaiser | Sept. 2, 1952 |

FOREIGN PATENTS

| | | |
|---|---|---|
| 580,316 | France | Nov. 4, 1924 |